United States Patent
Tschantz

(10) Patent No.: US 10,221,016 B2
(45) Date of Patent: Mar. 5, 2019

(54) METHOD AND APPARATUS FOR DRIVING A CONVEYOR

(71) Applicant: Imperial Technologies, Inc., Canton, OH (US)

(72) Inventor: Richard W. Tschantz, Louisville, OH (US)

(73) Assignee: Imperial Technologies, Inc., Canton, OH (US)

( * ) Notice: Subject to any disclaimer, the term of this patent is extended or adjusted under 35 U.S.C. 154(b) by 0 days.

(21) Appl. No.: 15/590,355

(22) Filed: May 9, 2017

(65) Prior Publication Data

US 2017/0327317 A1   Nov. 16, 2017

Related U.S. Application Data

(60) Provisional application No. 62/334,148, filed on May 10, 2016.

(51) Int. Cl.
*B65G 15/30* (2006.01)
*B65G 15/56* (2006.01)
*B65G 17/02* (2006.01)

(52) U.S. Cl.
CPC ........... *B65G 17/02* (2013.01); *Y10S 198/957* (2013.01)

(58) Field of Classification Search
None
See application file for complete search history.

(56) References Cited

U.S. PATENT DOCUMENTS

| | | | | |
|---|---|---|---|---|
| 3,947,113 A | * | 3/1976 | Buchan | G03G 15/1615 399/308 |
| 4,024,949 A | * | 5/1977 | Kleysteuber | B65G 17/02 198/830 |
| 4,205,745 A | * | 6/1980 | VanLingen | B65G 17/02 198/703 |

\* cited by examiner

*Primary Examiner* — Kavel Singh
(74) *Attorney, Agent, or Firm* — Sand, Sebolt & Wernow LPA

(57) ABSTRACT

A conveyor belt assembly may include a conveyor belt having an elastomeric layer, a chain adjacent a side edge of the conveyor belt and a flexible bridge extending between and connected to the chain and the conveyor belt along the side edge. The chain, bridge and conveyor belt may be driven to revolve by a sprocket engaging the chain.

18 Claims, 9 Drawing Sheets

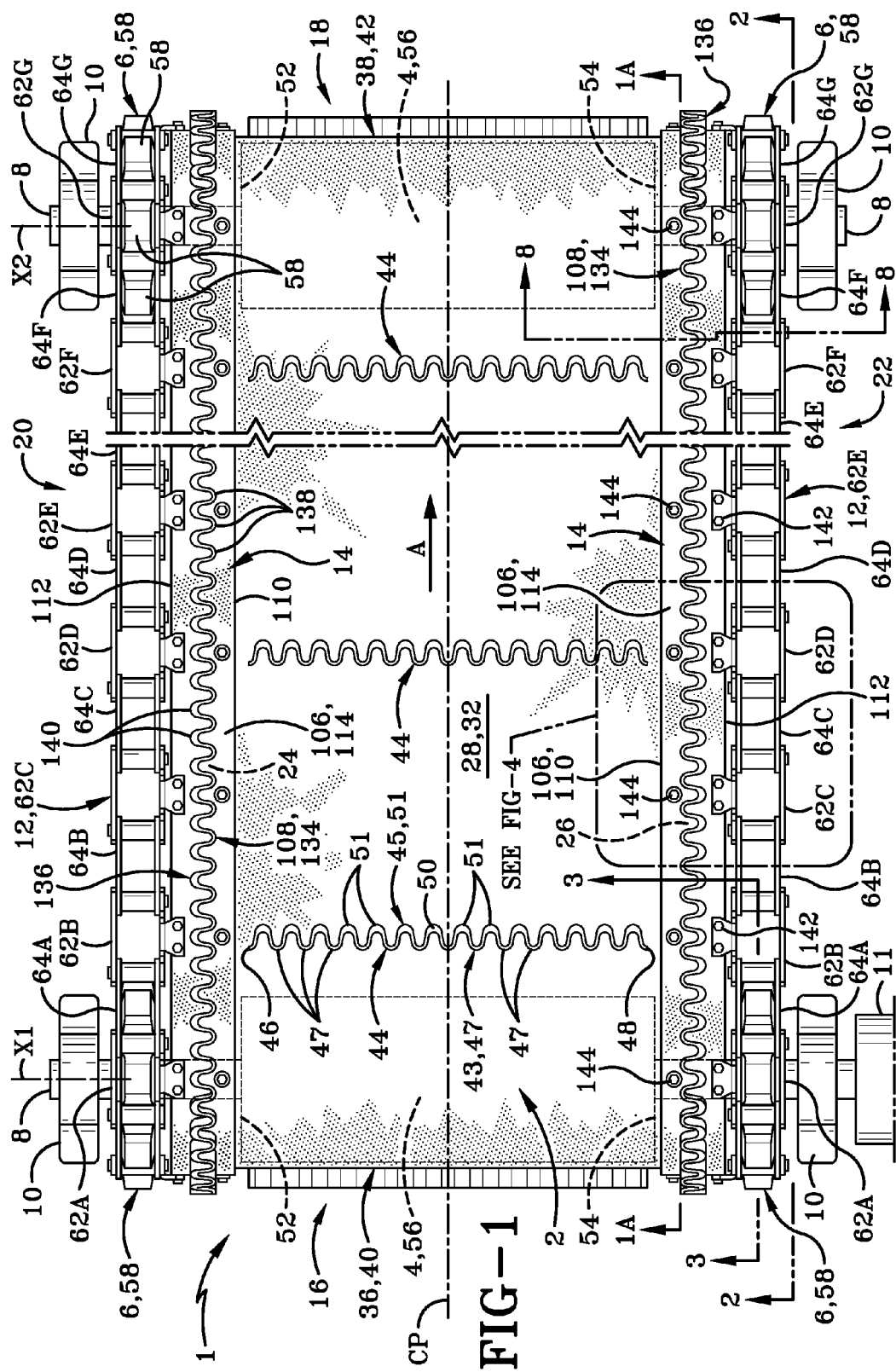

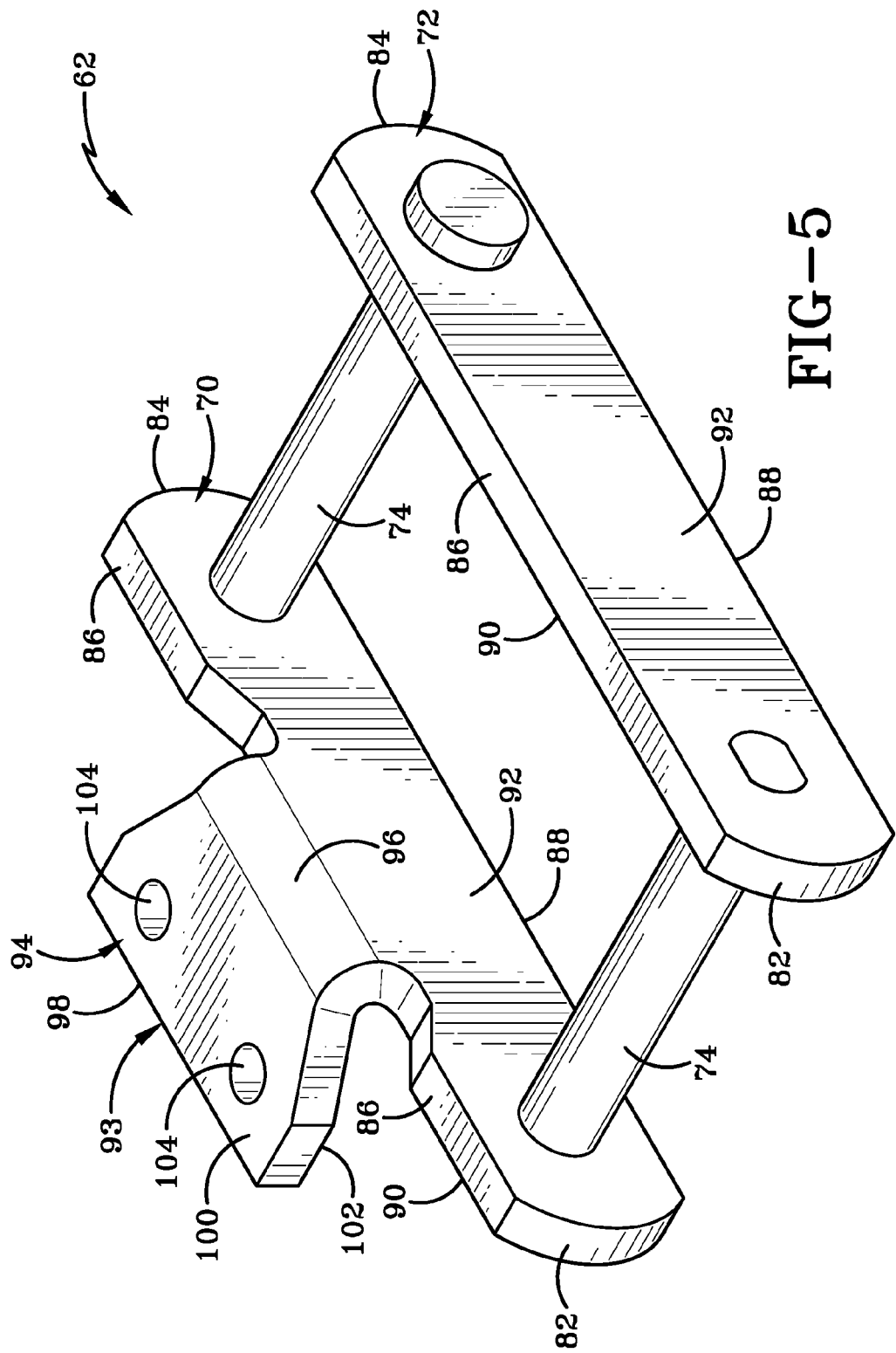

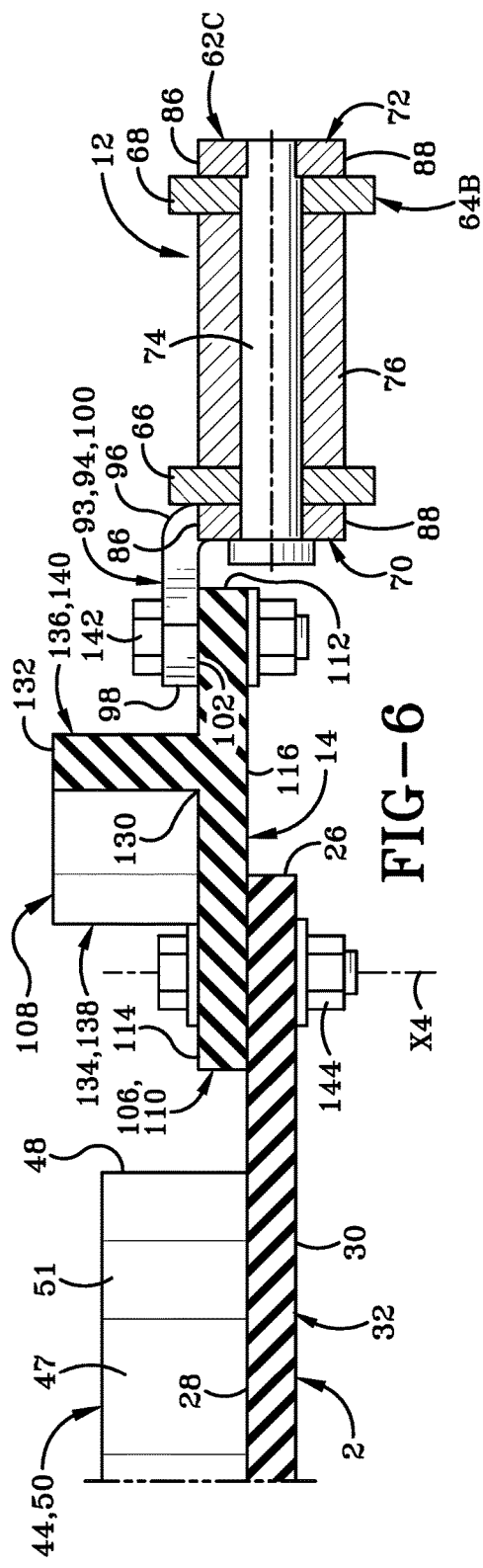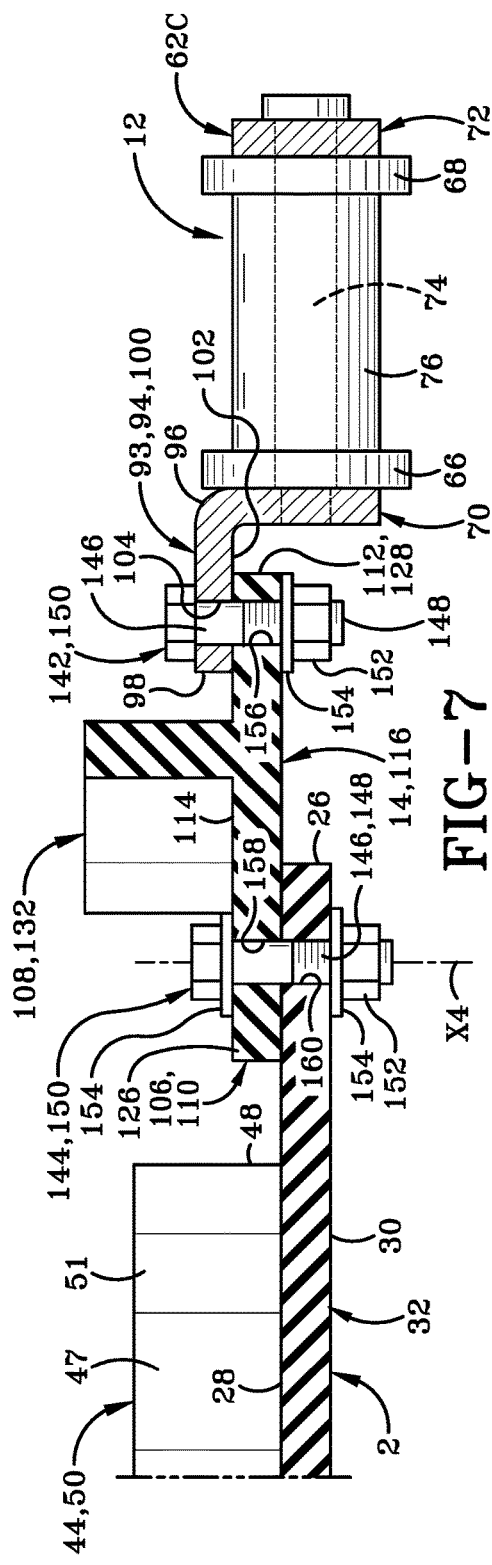

METHOD AND APPARATUS FOR DRIVING A CONVEYOR

CROSS REFERENCE TO RELATED APPLICATIONS

This application claims the benefit of U.S. Provisional Patent Application Ser. No. 62/334,148, filed on May 10, 2016; the disclosure of which is entirely incorporated herein by reference as if fully rewritten.

BACKGROUND OF THE INVENTION

Technical Field

The present invention is related generally to conveying systems. More particularly, the present invention is related to chain driven conveyor belts.

Background Information

Amongst the many types of conveyors are those which use a conveyor belt. Various types of conveyor belts are available including those which may include a rubber or other elastomeric layer. While chain driven conveyor belts have been developed for certain types of metal conveyor belts, there is a need in the art for a chain driven conveyor belt comprising an elastomeric layer.

SUMMARY

In one aspect, the invention may provide an apparatus comprising a conveyor belt comprising an elastomeric layer and having first and second side edges; a chain adjacent the first side edge; and a flexible bridge extending between and connected to the chain and the conveyor belt along the first side edge.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

FIG. 1 (FIG. 1A) is a sectional view taken on line 1A-1A of FIG. 1.

FIG. 5 (FIG. 5) is a perspective view of one of the chain links.

FIG. 6 (FIG. 6) is a sectional view taken on line 6-6 of FIG. 4.

FIG. 7 (FIG. 7) is a sectional view taken on line 7-7 of FIG. 4.

Similar numbers refer to similar parts throughout the drawings.

DETAILED DESCRIPTION

Figure 1A:
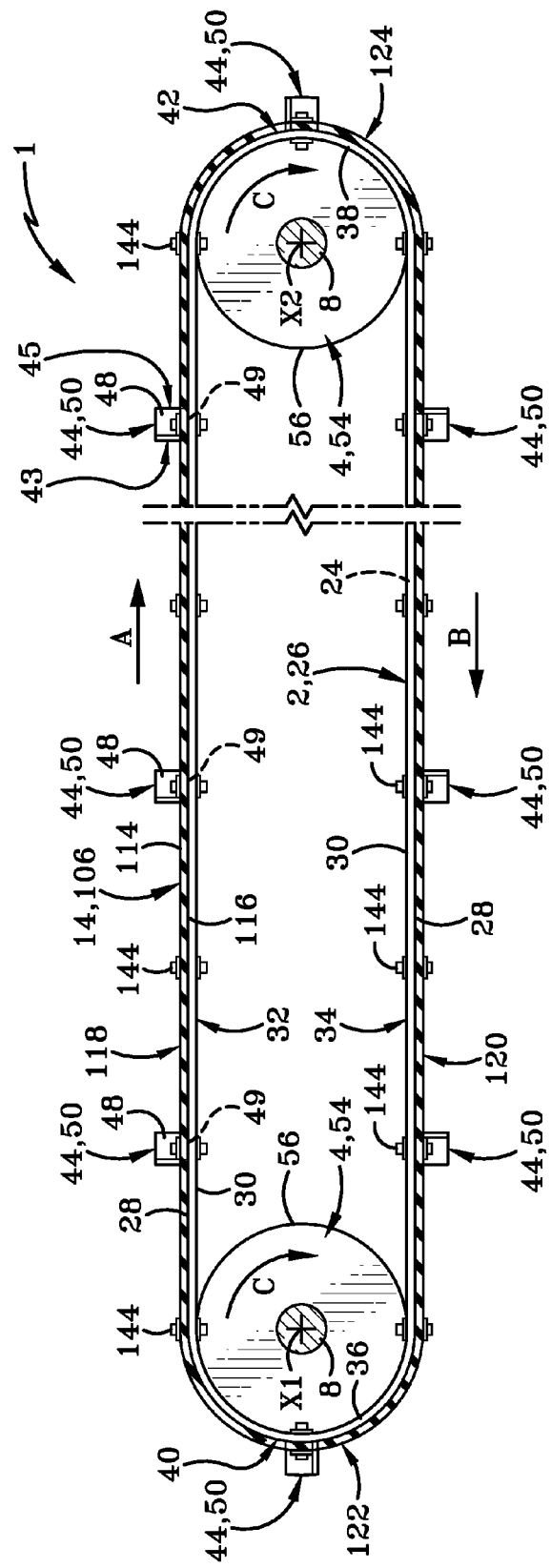
FIG. 1 (FIG. 1) is a top plan view of a conveyor belt assembly with portions cut away showing the conveyor belt, chains for driving the conveyor belt and respective flexible bridges extending between the conveyor belt and chains.

FIG. 1 shows a conveyor belt system or assembly generally at 1. Conveyor belt assembly 1 may include a flexible conveyor belt 2, rollers 4, sprockets 6, shafts 8, bearing mounts 10, a motor 11, left and right chains 12 and left and right flexible bridges 14. Assembly 1 has an upstream end 16 and a downstream end 18 defined therebetween a longitudinal direction, and left and right sides 20 and 22 defined therebetween an axial direction.

Conveyor belt 2 has a first or left side edge 24, a second or right side edge 26, and outer and inner surfaces 28 and 30 each of which extend in a continuous manner from side edge 24 to side edge 26. Conveyor belt 2 is an endless belt or forms a closed loop such that each of side edges 24 and 26 and each of outer and inner surfaces 28 and 30 likewise form closed loops. Belt 2 includes an upper generally flat segment 32, a lower generally flat segment 34, an upstream end curved segment 36 and a downstream end curved segment 38. Curved segments 36 and 38 respectively define upstream and downstream ends 40 and 42 of belt 2. Outer surface 28 serves as an upwardly facing top surface of upper segment 32, while inner surface 30 serves as a downwardly facing bottom surface of upper segment 32. Outer surface 28 serves as a downwardly facing bottom surface of lower segment 34, while inner surface 30 serves as an upwardly facing top surface of lower segment 34. When belt 2 is revolving, upper segment 32 moves in a downstream direction (Arrow A) and lower segment 34 moves in an upstream direction (Arrow B). Belt has a center which is midway between left and right side edges 24 and 26 and which lies along or may be represented by a longitudinally extending vertical central plane CP which intersects belt 2 midway between side edges 24 and 26.

Belt 2 may include a plurality of axially elongated cleats 44 which extend from adjacent left side edge 24 to adjacent right side edge 26. Cleats 44 may be generally straight and perpendicular to the downstream direction or may have various configurations, such as a chevron configuration or any other configuration known in the art. In the sample embodiment, cleats 44 are serpentine cleats which may have a sinoidal configuration. Each cleat 44 may have a left end 46 which is adjacent and axially spaced inwardly from left side edge 24, and a right end 48 which is adjacent and spaced axially inwardly from right side edge 26. Each cleat 44 is secured at an axially elongated inner edge 49 thereof and extends outwardly therefrom to an axially elongated outer edge 50 which extends from left end 46 to right end 48. Cleats 44 may have various heights defined between inner and outer edges 49 and 50. By way of example, the distance or height between inner and outer edges 49 and 50 may be in a range of ½ or 1 inch to 1, 2, 3, 4, 5 or 6 inches or more depending upon the specific scenario.

As previously noted, cleats 44 may be a serpentine cleat or wall. Thus, each cleat 44 may include upstream U-shaped segments 47 and downstream U-shaped segments 51 which are secured to segments 47 to form this serpentine configuration which may be a sinoidal configuration. More particularly, segments 47 and 51 are U-shaped as viewed from above along upper segment 32. U-shaped segments 47 are inverted relative to U-shaped segments 51. When cleat 44 has such a serpentine configuration, the tips of upstream U-shaped segments 47 define upstream edge 43, while the tips of downstream U-shaped segments 51 define downstream edge 45. A given U-shaped segment 47 which is secured to an adjacent U-shaped segment 51 forms an S-shaped configuration as viewed from above along the upper segment 32. The noted tips of the given segments 47 and 51 are defined by convexly curved surfaces of the respective segments 47 and 51. For the right bridge 14, the tips of the upstream segments 47 face upstream while the tips of the downstream segments 51 face downstream.

Belt 2 is typically formed primarily of a rubber or elastomeric layer which defines side edges 24 and 26 and outer and inner surfaces 28 and 30. This elastomeric layer may have various other materials embedded therein, wherein these other materials are different than the elastomer of which the elastomeric layer is formed. For instance, there may be various types of fibers, which may be formed into various sized strands and often as belted layers. In addition, these embedded materials may include embedded metal strands or strips or other configurations. These embedded materials may include any other suitable materials known in the art. Cleats 44 may be formed of various materials also known in the art. In the sample embodiment, each cleat 44 is formed of an elastomeric material which may be the same material as that which forms the elastomeric layer or belt 2. Thus, the primary material of which belts 2 and cleats 44 are formed may be compressible and flexible. In addition, cleats 44 and belt 2 may be formed integrally with continuous elastomeric material.

Rollers 4 are typically rigid and may be formed of various rigid materials, and may be formed of metal. Each of rollers 4 has a first or left end 52 and a second or right end 54 with a cylindrical outer surface 56 extending from adjacent left end 52 to adjacent right end 54. Left end 52 is adjacent left side edge 24 of belt 2, while right end 54 is adjacent right side edge 26. The curved inner surface 30 along curved segments 36 and 38 of belt 2 is in contact with the respective cylindrical outer surfaces 56 of the upstream and downstream rollers 4. Upper segment 32 of belt 2 extends from an upper portion of the upstream roller 4 outer surface 56 to an upper portion of the downstream roller 4 outer surface 56. Lower segment 34 extends from a lower portion of upstream roller 4 outer surface 56 to a lower portion of downstream roller 4 outer surface 56. Each shaft 8 may be a single shaft which extends through roller 4 and outwardly on either side thereof or may be two separate shafts each extending outwardly from the respective left and right ends 52 and 54 of the given roller. More particularly, shaft 8 extends outwardly to the left from left end 52 of the given roller 4 in the axial direction to a terminal end, and shaft 8 likewise extends outwardly to the right from right end 54 of the given roller 4 in the axial direction to a terminal end.

Sprockets 6 and shafts 8 are typically rigid and formed of a rigid material which may be metal. Sprockets 6 include a pair of upstream sprockets and a pair of downstream sprockets each of which includes left and right sprockets. The upstream set of sprockets 6, the upstream shaft 8 and the upstream roller 4 are all rotatable together as a unit about an axis X1 which may be essentially horizontal. Likewise, the downstream set of sprockets 6, the downstream shaft 8 and downstream roller 4 are all rotatable together as a unit about an axis X2 which may also be essentially horizontal and parallel to axis X1. Axes X1 and X2 may extend in the axial direction and pass respectively through the upstream and downstream shafts 8. The upstream shaft 8 is rotatably mounted via bearings of the respective upstream bearing mounts 10, while the downstream shaft 8 is rotatably mounted on respective bearings of the left and right downstream bearing mounts 10. Bearing mounts 10 are typically secured to a rigid frame or fixed structure.

Each sprocket 6 is rigidly secured to one of shafts 8 and extends radially outwardly therefrom away from the respective axis X1 or X2. Each sprocket 6 has a plurality of teeth 58 which extend radially outwardly away from respective axis X1 or X2. Each adjacent pair of teeth 58 defines therebetween a link receiving space 60 so that each sprocket 6 defines a plurality of spaces 60. Motor 11 has a rotational output which is rotationally coupled to the upstream shaft 8 in order to drive rotation of the upstream shaft 8, the upstream sprockets 6, and the upstream roller 4, thereby causing revolution of chains 12 via the engagement of chains 12 with the upstream sprockets 6, thereby causing rotation of the downstream sprockets 6, downstream shaft 8 and downstream roller 4 via engagement between the downstream sprockets 6 and chains 12 respectively. Rotation of the upstream and downstream rollers 4, sprockets 6 and shafts 8 is shown at Arrows C in FIG. 1A. The revolving movement of chains 12 likewise causes the revolving movement of bridges 14 and conveyor belt 2.

Each chain 12 includes a plurality of chain links 62 and 64. FIG. 1 shows that chain links 62 may include links 62A-G and that chain links 64 may include links 64A-G, and FIG. 2 shows additional links 62 and 64. Links 62 are longitudinally spaced from one another such that various of links 62 are upstream or downstream of other of said links 62. Links 64 are likewise longitudinally spaced from one another such that a given link 64 may be upstream or downstream from another one of links 64. In the sample embodiment, each link 62 is coupled or linked to one of links 64 such that every other link is a link 62 and every other link is a link 64. In the configuration shown, each link 62 is coupled or linked directly to two links 64 respectively upstream and downstream of the given link 62. For example, link 62B is directly coupled to link 64A upstream thereof and link 64B downstream thereof. Similarly, each link 64 is directly connected to a pair of links 62 which are respectively upstream and downstream of the given link 64. For example, link 64C is directly coupled to link 62C upstream thereof and link 62D downstream thereof. However, this specific configuration may vary. For instance, two or more links 64 may be disposed between a given pair of links 62 such that there are no other links 64 between that given pair of links 62. One skilled in the art will understand that various configurations in this regard may be used.

Figure 4:
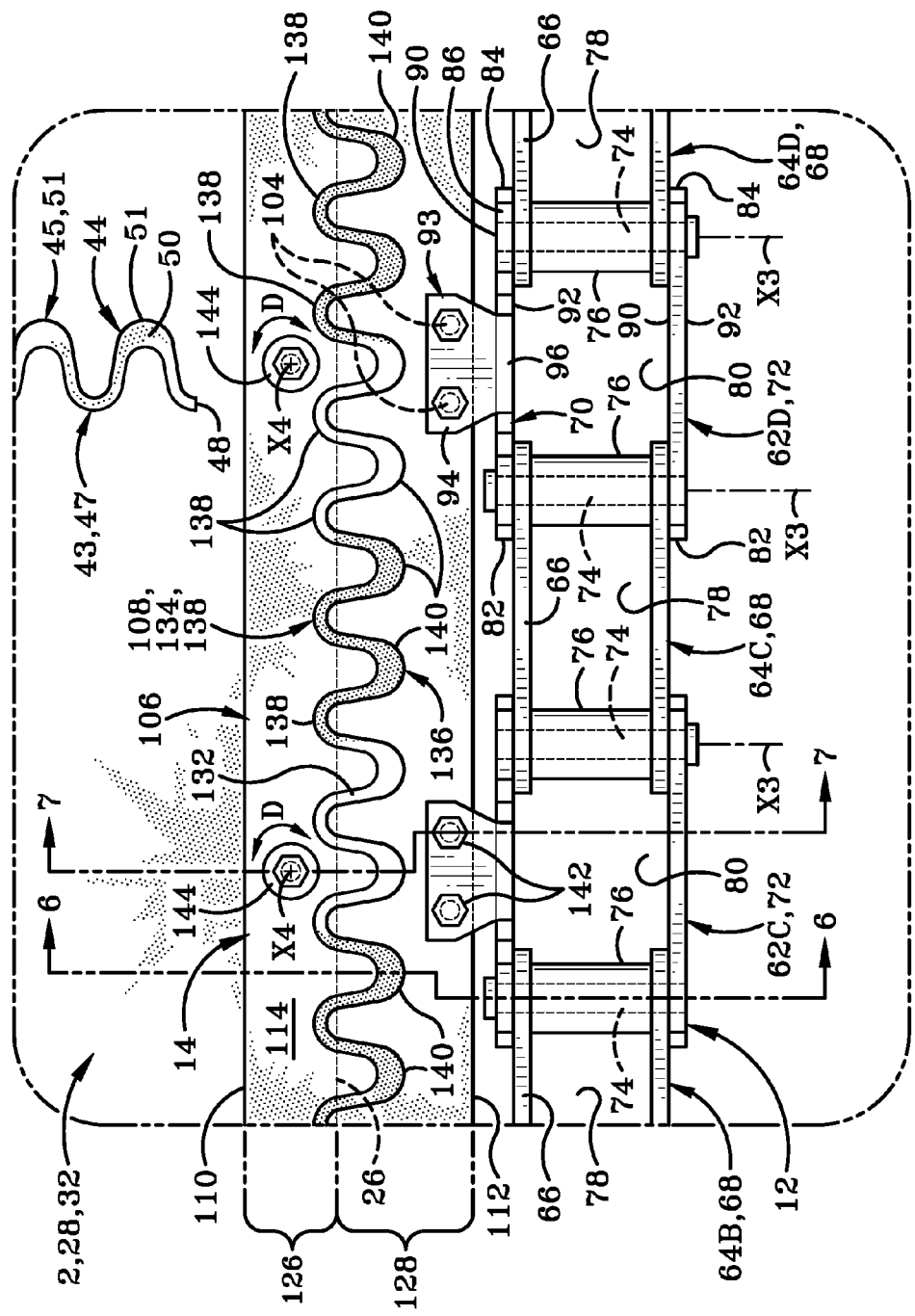
FIG. 4 (FIG. 4) is an enlarged view of the encircled portion of FIG. 1.

With primary reference to FIG. 4, each link 64 has a rigid inner link plate 66 and a rigid outer link plate 68. Each link 64 has a rigid inner link plate 70 and a rigid outer link plate 72. Each chain 12 also includes a plurality of rigid pins 74 and may further include a plurality of rigid rollers 76. Each of link plates 66, 68, 70 and 72, and pins 74 and rollers 76 are formed of rigid materials, typically a metal, which may be steel or other suitable metal. Each link 62 includes a pair of pins 74. Likewise, each link 64 includes a pair of pins 74. Each adjacent pair of links 62 and 64, namely those that are directly coupled to one another, include a common pin 74 and may include a common roller 76. Pins 74 are axially elongated and longitudinally spaced from one another, as are rollers 76. Each of inner and outer link plates 66, 68, 70 and 72 are longitudinally elongated. The inner and outer link plates 66 and 68 of a given link 64 are axially spaced from one another to define therebetween a sprocket tooth-receiving space 78. Space 78 is also defined between the two pins 74 of a given link 64 and may likewise be defined between the two rollers 76 of a given link 64. The inner and outer link plates 70 and 72 of each link 62 are axially spaced from one another to define therebetween a sprocket tooth-receiving space 80, which is also defined between the two pins 74 of the given link 62. A given space 80 may also be defined between the two rollers 76 of a given link 62. Each pin 74 extends between and is connected to one inner link plate 70, one inner link plate 66, one outer link plate 68 and one outer link plate 72 so that the inner and outer plate 66 and 68 of a given link 64 are pivotable relative to the inner and outer link plates 70 and 72 of a given link 62 which is coupled by the given pin 74 about an axis X3 which extends in the axial direction, which passes through the given pin 74, and which may be essentially horizontal and parallel to axes X1 and X2. During this pivotal movement, link plates 66 and 70 may slidably engage one another, as may outer link plates 68 and 72. Each pin 74 may have a cylindrical outer surface. Each roller 76 is typically a hollow cylinder having a cylindrical inner surface defining a passage in which is received pin 74. Each roller 76 may have a cylindrical outer surface. Each roller 76 is freely rotatable with pin 74 within the passage of the given roller 76 about axis X3 of the given pin 74.

Referring now primarily to FIG. 5, the inner and outer link plates 70 and 72 each have first and second opposed ends 82 and 84 which are longitudinally spaced from one another, an upwardly facing top or top edge 86, a downwardly facing bottom or bottom edge 88, a first side surface 90 and a second side surface 92 which faces away from surface 90. Each of surfaces 90 and 92 extend from adjacent the respective first end 82 to adjacent the second end 84 and from adjacent top 86 to adjacent bottom 88. Surfaces 92 face away from conveyor belt 2 and bridges 14, while surfaces 90 face toward conveyor belt 2 and bridges 14. Inner link plate 70 is part of a link plate assembly 93 which includes a rigid tongue 94 which is rigidly secured to and extends axially away from plate 70 toward belt 2 and bridges 14. Tongue 94 thus also extends from link plate 70 in a direction away from link plate 72. Tongue 94 has a base 96 which is rigidly secured to link plate 70 and extends axially outwardly therefrom to a tip or terminal end or edge 98 which faces toward conveyor belt 2 and bridges 14. Link plate 70 and tongue 94 may be formed as essentially flat plates which may be perpendicular to one another. Tongue 94 has top and bottom surfaces 100 and 102 which may be essentially parallel to one another and essentially perpendicular to surfaces 90 and 92 of plate 70. A pair of holes 104 may be formed in tongue 94 which are longitudinally spaced from one another and which extend from the upwardly facing top surface 100 to the downwardly facing bottom surface 102 whereby holes 104 are through holes. Link plate assembly 93 may be formed as a single piece of metal including link plate 70 and tongue 94 which is bent at a longitudinally elongated bend along base 96 and top 100. Unlike link plate assembly 93 in which tongue 94 extends outwardly to the side in the axial direction from link plate 70, in the sample embodiment no such tongue or other structure extends axially away from link plates 66, 68 and 72 beyond their respective side surfaces.

Figure 8:
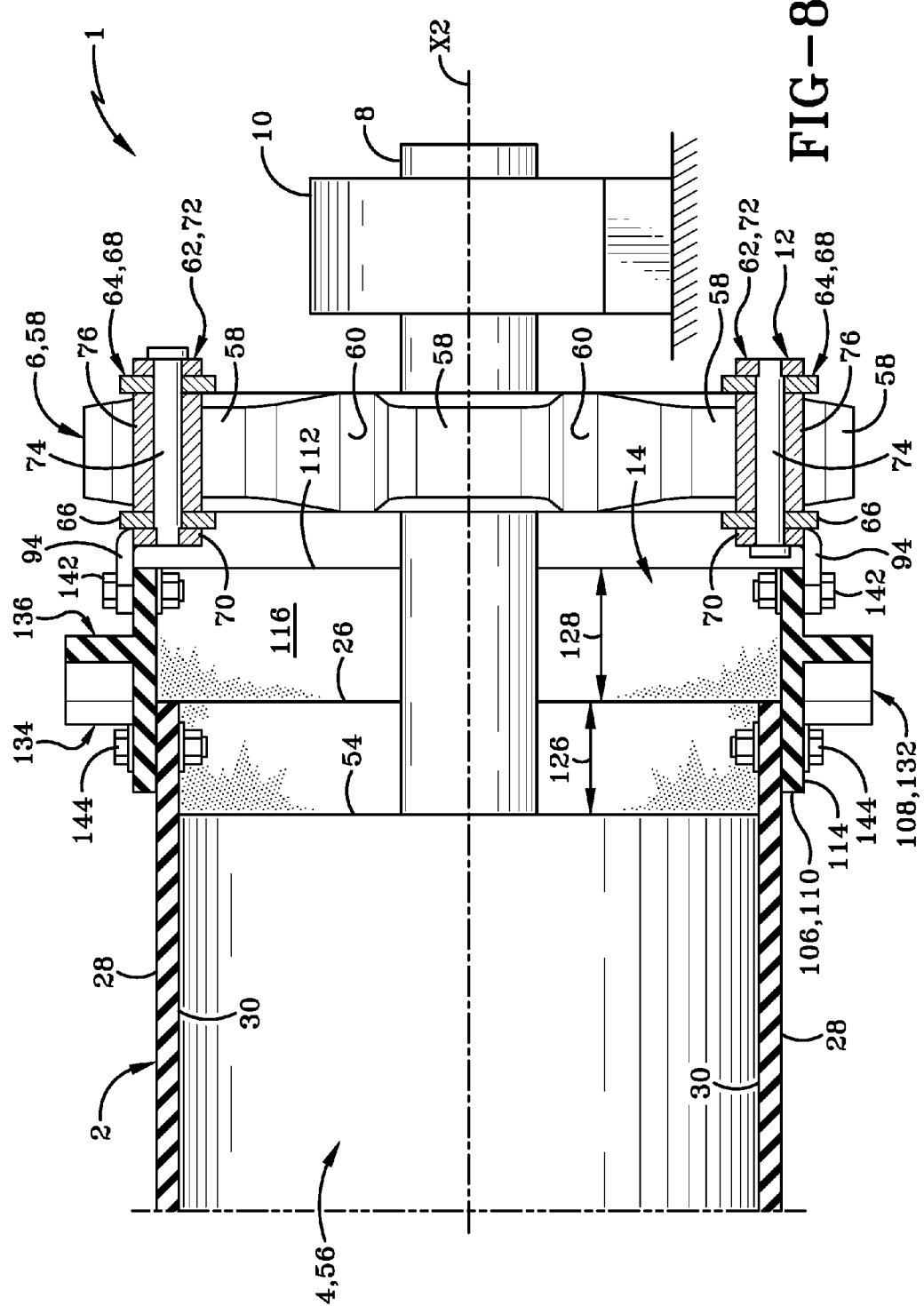
FIG. 8 (FIG. 8) is a sectional view taken on line 8-8 of FIG. 1.

With reference to FIGS. 1, 1A, 4 and 6-8, bridges 14 will be described in greater detail. Left and right bridges 14 may be essentially mirror images of one another although this may vary. Each bridge 14 may include a base wall or layer 106 and an upstanding seal or wall 108 which is secured to layer 106 and extends outwardly therefrom. Bridge 14 may have a cross section which is T-shaped (or inverted T-shaped), as shown in FIGS. 6-8. Each bridge 14 forms a closed loop which in its entirety extends along the entire closed loop formed by the given side edge 24 or 26 of conveyor belt 2. Each of walls 106 and 108 likewise forms a closed loop which in its entirety extends along the given closed loop of the corresponding side edge 24 or 26 along which the given bridge 14 is secured to conveyor belt 2. Each bridge 14 has an inner side edge 110, an outer side edge 112, an outer surface 114 and an inner surface 116. Each of edges 110 and 112 and surfaces 114 and 116 forms a closed loop which in its entirety extends along the given side edge 24 or 26 of belt 2 to which the given bridge 14 is secured. The inner and outer side edges 110 and 112 of a given bridge 14 face in the axial direction away from one another. The inner side edges 110 of each bridge 14 face toward one another and toward the center or center plane CP of conveyor belt 2. Each inner side edge 110 also faces toward the opposite side edge 24 or 26 and the opposite bridge 14 and opposite chain 12 on the opposite side of assembly 1. Each outer side edge 112 faces away from the opposite side edge of belt 2, the opposite bridge 14 and the opposite chain 12. For a given bridge 14, the side edge 110 thereof faces the chain 12 to which the given bridge is connected.

Each bridge 14 has a longitudinally elongated upper generally flat segment 118, a longitudinally elongated lower generally flat segment 120, an upstream end curved segment 122 and a downstream end curved segment 124. Outer and inner surfaces 114 and 116 along upper segment 118 are respectively upwardly facing and downwardly facing surfaces. Outer and inner surfaces 114 and 116 along lower segment 120 are respectively downwardly facing and upwardly facing surfaces. Outer surface 114 along upstream curved segment 122 faces generally upstream in the longitudinal direction. Inner surface 116 along upstream curved segment 122 faces generally downstream in the longitudinal direction. Outer surface 114 along downstream curved segment 124 faces downstream in the longitudinal direction, while inner surface 116 along segment 124 faces upstream in the longitudinal direction. Inner surface 116 along its entire length is closely adjacent or in contact with outer surface 28 of conveyor belt 2 along the entire closed loop formed by outer surface 28 adjacent the given side edge 24 or 26 along which the given bridge 14 is connected to belt 2. Thus, along any given portion of bridge 14 and a corresponding portion of belt 2 along which the portion of bridge 14 extends, inner surface 116 faces outer surface 28, while outer surface 114 faces away from outer surface 28. However, it is noted that while the bridge 14 as shown in the sample embodiment has a longer closed loop than that of conveyor belt 2, the closed loop of bridge 14 may be smaller than that of conveyor belt 2 such that base wall 106 is connected to the conveyor belt 2 with the endless loop of wall 106 within the endless loop of belt 2, whereby the outer surface 114 of bridge wall 106 would face and be closely adjacent or abutting inner surface 30 of belt 2.

Each bridge 14 in its entirety extends along a given left side or right side 20 and 22 of assembly 1 and also along the given left or right side edge 24 or 26 and also along the corresponding left or right chain 12. Layer or wall 106 overlaps conveyor belt 2 along a given side edge 24 or 26 such that wall 106 has an overlap portion 126 and a non-overlap portion 128. Overlap portion 126 thus overlaps belt 2 along the given side edge 24 or 26 while non-overlap portion 128 does not overlap belt 2 along the given side edge. Thus, inner side edge 110 of a given bridge 14 is closer (normal distance) to the opposite side of assembly 1, the opposite bridge 14, the opposite chain 12 and the center or center plane CP of belt 2 than is the corresponding belt 2 side edge 24 or 26, which is likewise closer (normal distance) to the opposite side of assembly 1, opposite bridge 14, opposite chain 12 and the center or center plane CP of belt 2 than is outer side edge 112 of the given bridge 14. It may also be said that conveyor belt 2 extends outwardly in the axial direction away from the center or center plane CP beyond the inner side edge 110 of each bridge 14, whereby conveyor belt 2 extends outwardly farther in this manner to the left of inner side edge 110 of the left bridge 14 and outwardly to the right beyond the inner side edge 110 of the right bridge 14. It may also be said that each bridge 14, namely the non-overlapping portion 128, extends outwardly in the axial direction away from the center or center plane CP of belt 2 beyond the given side edge 24 or 26, whereby the non-overlapping portion 128 of the left bridge 14 extends outwardly to the left beyond left side edge 24 and the non-overlapping portion 128 of right bridge 14 extends outwardly to the right beyond right side edge 26.

Seal or wall 108 has a base or inner end or edge 130 and an outer edge or terminal edge 132. Wall 108 may have various heights defined between inner and outer edges 130 and 132. By way of example, the distance or height between inner and outer edges 130 and 132 may be in a range of ½ or 1 inch to 1, 2, 3, 4, 5 or 6 inches or more depending upon the specific scenario. Base or inner edge 130 is secured to outer surface 114 of wall 106 to secure wall 108 to wall 106. Wall 108 extends outwardly from outer surface 114 to terminal outer edge 132. Each of edges 130 and 132 are longitudinally elongated and typically extend in a continuous fashion along the entire length of wall 108, thereby forming respective closed loops. Wall 108 has an inner side edge 134 which faces the center or center plane CP of belt 2 and the opposite side of assembly 1 and the opposite side bridge and chain. Wall 108 has an outer side edge 136 which faces away from the center plane CP and the opposite side of assembly 1 and the opposite side belt and chain. Inner side edge 134 of wall 108 of a given bridge 14 faces away from the chain 12 to which the given bridge 14 is connected. Outer side edge 136 of wall 108 of a given belt faces the chain 12 which is connected to the given bridge.

As previously noted, wall 108 may be a serpentine wall or seal. Thus, wall 108 may include inner U-shaped segments 138 and outer U-shaped segments 140 which are secured to segments 138 to form this serpentine configuration which may be a sinoidal configuration. More particularly, segments 138 and 140 are U-shaped as viewed from above along upper segment 118 of a given bridge 14. U-shaped segments 138 are inverted relative to U-shaped segments 140. When wall 108 has such a serpentine configuration, the tips of inner U-shaped segments 138 define inner side edge 134, while the tips of outer U-shaped segments 140 define outer side edge 136. A given U-shaped segment 138 which is secured to an adjacent outer U-shaped segment 140 forms an S-shaped configuration as viewed from above along the upper segment 118. The noted tips of the given segments 138 and 140 are defined by convexly curved surfaces of the respective segments 138 and 140. For the right bridge 14, the tips of the inner segments 138 face leftward while the tips of the outer segments 140 face rightward. For the left bridge 14, the tips of the inner segments 138 face rightward and the tips of the outer segments 140 face leftward.

Referring now to FIGS. 1, 4 and 6-8, each bridge 14 is connected to the corresponding chain 12 by a plurality of fasteners 142, and to conveyor belt 2 by a plurality of fasteners 144. In the sample embodiment, there are sets of fasteners which include one fastener 144 and two fasteners 142 which are all adjacent one another. Each of these sets of fasteners 142, 144 is associated with a respective one of links 62 and tongues 94. Thus, these fastener sets are longitudinally spaced from one another as are links 62 and tongues 94. The fasteners 142 within a given one of these sets is longitudinally spaced from one another and axially spaced from the fastener 144 within the given set. Bridge 14 may thus be part of a bridge assembly which includes fasteners 142 and 144, and may also be part of a chain and bridge assembly which may include the chain 12 to which bridge 14 is connected and fasteners 142 and 144.

Each of fasteners 142 and 144 may include a bolt or screw having an elongated shaft 146 with an externally threaded portion 148, an enlarged head 150 which extends outwardly from shaft 146 at a head end thereof, an internally threaded nut 152 which threadedly engages threaded portion 148, and one or more washers 154. The shafts 146 of fasteners 142 and 144 may be elongated in a direction which is essentially parallel to one another and which is essentially perpendicular to each of axes X1, X2 and X3 and each of outer and inner surfaces 28 and 30 of belt 2, outer and inner surfaces 114 and 116 of wall 106, and top and bottom surfaces 100 and 102 of tongue 94. The shafts 146 of fasteners 142 and 144 may also be elongated in a direction which is essentially perpendicular to the downstream direction of the conveyor belt, bridges and chains.

The shaft 146 of each of the chain fasteners 142 extends from tongue 94 to non-overlap portion 128 of wall 106 of a given bridge 14 to connect tongue 94 to non-overlap portion 128 of wall 106 of the given bridge 14. In the sample embodiment, this shaft 146 extends through one of holes 104 in tongue 94 and through an aligned through hole 156 formed in non-overlap portion 128 extending from outer surface 114 to inner surface 116 adjacent outer side edge 112. Bottom surface 102 of tongue 94 faces and is closely adjacent or in contact with outer surface 114 of wall 106. Head 150 may be closely adjacent or in contact with top surface 100 of tongue 94 although a washer such as washer 154 may also be disposed between head 150 and top surface 100. Washer 154 of fastener 142 may be closely adjacent or abut inner surface 116 of wall 106. Nut 152 may be adjacent surface 116. Of course, fastener 142 may be inverted such that head 150 is adjacent surface 116, while nut 152 is adjacent or in contact with surface 100. Thus, the head 150 or nut 152 of fastener 142 may be respectively above or below tongue 94 and surfaces 100 and 102 thereof. Whether fastener 142 is in the form of a bolt or screw, the threaded portion 148 may threadedly engage belt 2 within hole 156. Tongue 94 may be essentially parallel to each of wall 106 and belt 2. Thus, surfaces 100 and 102 of tongue 94 may be essentially parallel to each of wall 106 surfaces 114 and 116 and belt 2 surfaces 28 and 30. Although the figures show tongue 94 atop wall 106 along the upper segments of belt 2 and bridge 14 and beneath wall 106 along the lower segments of belt 2 and bridge 14, some or all of chain links 62 may be inverted relative to the position shown so that tongue 94 is beneath wall 106 along the upper segments of belt 2 and bridge 14 and atop wall 106 along the lower segments of belt 2 and bridge 14.

Each of the conveyor belt fasteners 144 extends from overlap portion 126 to conveyor belt 2. In the sample embodiment, the shaft 146 of each fastener 144 extends through a pair of aligned holes 158 and 160 respectively formed in overlap portion 126 and conveyor belt 2 adjacent the respective side edge 24 or 26. Each hole 158 is a through hole extending from outer surface 114 to inner surface 116 of overlap portion 126. Each hole 160 is a through hole extending from outer surface 28 to inner surface 30 of belt 2. Holes 158 and 160 are axially spaced from holes 104 and 156. In the sample embodiment, the upper or outer washer 154 of each fastener 144 is closely adjacent or abuts outer surface 114 of overlap portion 126 adjacent hole 158. The head 150 of each fastener 144 may be adjacent or in contact with this washer 154 or surface 114. The sample embodiment also shows that the lower or inner washer 154 of each fastener 144 is closely adjacent or in contact with inner surface 30 of belt 2. The nut 152 of each fastener 144 may be closely adjacent or in contact with this washer 154 or surface 30. Of course, each fastener 144 may be reversed such that head 150 is adjacent surface 30 and nut 152 is adjacent surface 114. Thus, the head 150 or nut 152 of fastener 144 may be respectively above or below belt 2 and surfaces 28, 30 thereof and wall 106 and surfaces 114, 116 thereof. Whether the fastener 144 is in the form of a bolt or screw, the threaded portion 148 of each fastener 144 may threadedly engage belt 2 within hole 160 and/or overlap portion 126 within hole 158.

Each fastener 144 may serve as a pivot which allows for pivotal movement of bridge 14 and the chain 12 connected thereto relative to conveyor belt 2 about a longitudinal axis X4 of shaft 146 of the given fastener 144. This pivotal movement is illustrated at Arrows D in FIG. 4 and is allowed by the flexibility of the given bridge 14 as well as the flexibility of conveyor belt 2. Although the pivotal movement about each axis X4 is limited due to the fact that there are multiple fasteners 144, nonetheless this pivotal movement allows for some adjustable movement between the given chain 12 and the conveyor belt 2 as the conveyor belt 2, bridges 14 and chains 12 revolve during the operation of assembly 1. Axis X4 may be essentially perpendicular to each of axes X1, X2 and X3 and each of outer and inner surfaces 28 and 30 of belt 2, outer and inner surfaces 114 and 116 of wall 106, and top and bottom surfaces 100 and 102 of tongue 94. Axis X4 may also be essentially perpendicular to the downstream direction of the conveyor belt, bridges and chains.

Figure 9:
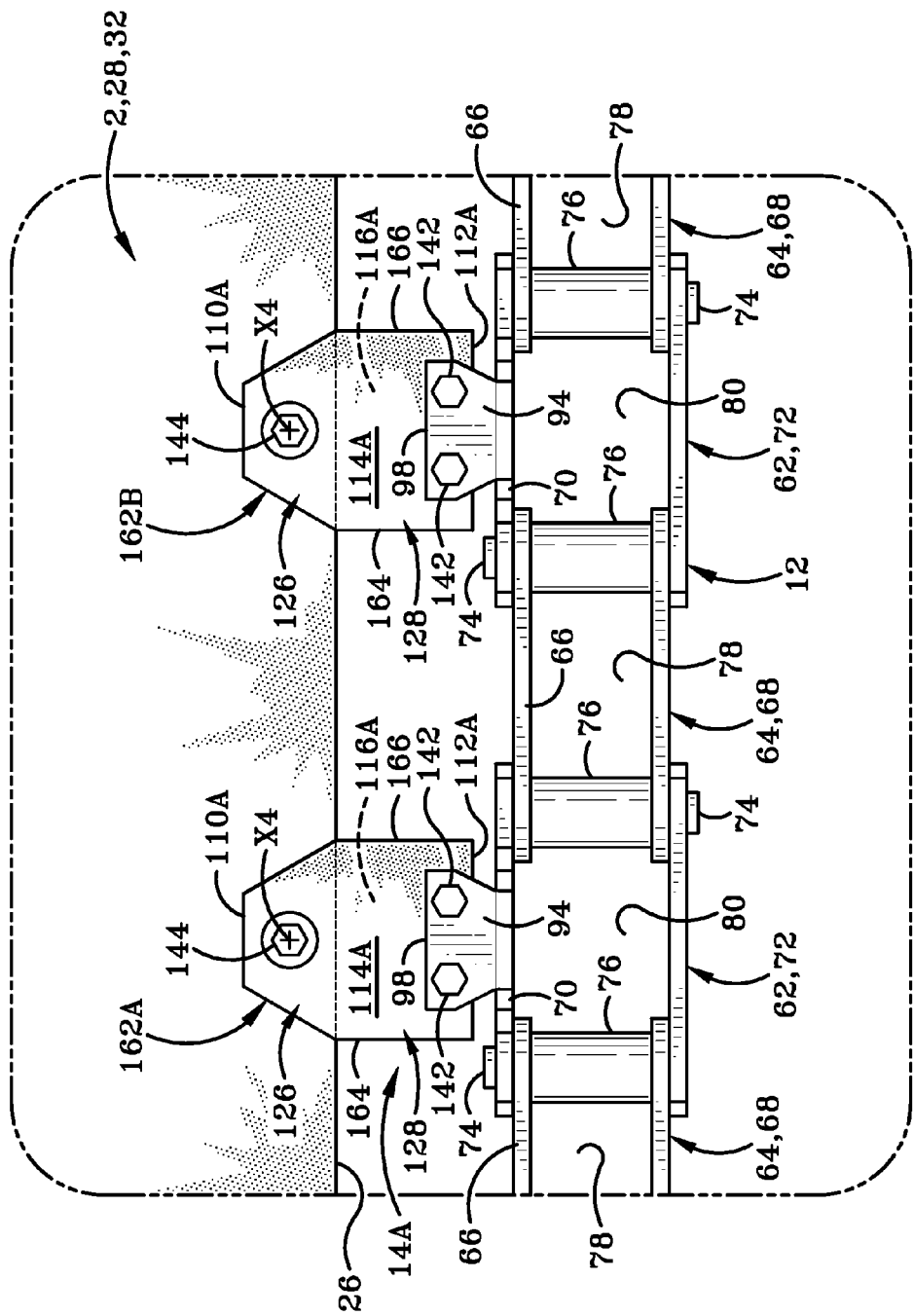
FIG. 9 (FIG. 9) is an enlarged view similar to FIG. 4 showing an alternate flexible bridge extending between one of the drive chains and conveyor belt.

FIG. 9, which is similar to FIG. 4, shows an alternate embodiment of a bridge 14A which is analogous to bridge 14, but includes multiple bridge segments 162. FIG. 9 shows only two of such bridge segments at 162A and 162B. It should be understood that bridge segments 162 may be attached to each of the tongues 94 of a given belt 12 such that segments 162 are longitudinally spaced from one another and are positioned generally along the entire length of the given chain 12 and the given side edge 24 or 26 of conveyor belt 2. Thus, for example, each bridge 14A may easily include 10, 20, 30, 40, 50 or more bridge segments 162. Each bridge segment 162 may be formed of the same or similar materials as discussed above with respect to conveyor belt 2 and layer 106 of bridge 14, such as an elastomeric material with possible embedded materials. In the sample embodiment, each bridge segment 162 is formed primarily of an elastomeric layer which may or may not have such embedded materials. Bridge 14A may be part of a bridge assembly which includes one or more bridge segments 162 and fasteners 142 and 144, and may also be part of a chain and bridge assembly which may include the chain 12 to which bridge 14A segments 162 are connected and fasteners 142 and 144.

Each bridge segment 162 includes some of the similar surfaces and edges described with respect to bridge 14. Thus for example, each segment 162 has an inner side edge 110A and an outer side edge 112A, an outer surface 114A and an inner surface 116A which are analogous to edges 110 and 112 and surfaces 114 and 116. Thus, these edges 110A and 112A and surfaces 114A and 116A face in the same directions as described above with respect to the analogous edges and surfaces of bridge 14. Each bridge segment 162 has axially elongated first and second ends or edges 164 and 166 which may also respectively be referred to as upstream and downstream ends or edges. Each edge 164, 166 extends from adjacent inner edge 110A to adjacent outer edge 112A. As shown in FIG. 9, segment 162A is upstream of segment 162B, or in other words, segment 162B is downstream of segment 162A. Upstream edge 164 faces in the upstream direction and downstream edge 166 faces in the downstream direction. The upstream edge 164 of the more downstream segment 162B faces downstream edge 166 of the more upstream segment 162A. Similar to bridge 14, each segment 162 has an overlap portion 126 and a non-overlap portion 128. In the sample embodiment, outer and inner surfaces 114A and 116A are essentially flat and extend from adjacent edge 110A to adjacent edge 112A and from adjacent edge 164 to adjacent edge 166. Thus, bridge 162 has a generally flat configuration as viewed in the downstream direction and has a cross-sectional appearance which is analogous to that of layer or wall 106 of bridge 14, as shown in FIGS. 6 and 7, with the upstanding wall or seal 108 removed. Thus, each segment 162 may be formed of a single wall or layer having flat outer and inner surfaces 114A and 116A. As seen in a sectional view analogous to FIG. 6, surfaces 114A and 116A can be essentially straight from adjacent edge 110A to adjacent edge 112A, just as are edges 114 and 116 of wall 106 from adjacent edge 110 to adjacent edge 112.

Each of bridge segments 162 is connected to one of tongues 94 of chain 12 in the same manner as described previously with respect to bridge 14 using fasteners 142 extending through holes formed in non-overlap portion 128 analogous to the holes 156 shown in FIG. 7. Likewise, each bridge segment 162 is connected to conveyor belt 2 by a fastener 144 extending through one of holes 160 formed in belt 2 and an aligned through hole formed in segment 162 analogous to hole 158 shown in FIG. 7. Similar to bridge 14, each fastener 144 may serve as a pivot which allows the pivotal movement of the corresponding belt segment 162 and chain 12 or the attached chain link 62 relative to conveyor belt 2 about the longitudinal axis X4 of fastener 144. This pivotal movement is illustrated at Arrows D in FIG. 9. Because bridge 14A is formed of multiple longitudinally spaced segments 162, the ability for the segments 162 and chain 12 to pivot about axes X4 relative to belt 2 is increased compared to the pivotal movement described with respect to bridge 14.

With respect to both bridge 14 and bridge 14A, it is noted that various components are axially outward of the respective ends 52 and 54 of each roller 4/outer surface 56, as may be seen in FIG. 1 and FIG. 8. That is, these components are a greater normal distance from the center CP of belt 2 than are the respective ends 52 or 54. This normal distance may be, for example, measured horizontally in the axial direction or parallel to axis X1 or axis X2, or perpendicular to the downstream direction. These components may include chains 12 in their entirety, belt 14 or 14A in its entirety and fasteners 142 and 144 in their entirety. Thus, for instance, these components may include all walls of the bridge or bridge segment and all surfaces and edges thereof; the various bolts or screws, washers and nuts of any of these fasteners; and the various links of the chains. Thus, the left chain 12, the left belt 14 or 14A, and the left sets of fasteners 142, 144 may be axially outward to the left of the left end 52 of each roller 4/outer surface 56, or a greater normal distance to the left from center CP of belt 2 than is of the left end 52 of each roller 4/outer surface 56. Likewise, the right chain 12, the right belt 14 or 14A, and the right sets of fasteners 142, 144 may be axially outward to the right of the right end 54 of each roller 4/outer surface 56, or a greater normal distance to the right from center CP of belt 2 than is of the right end 54 of each roller 4/outer surface 56.

Figure 2:
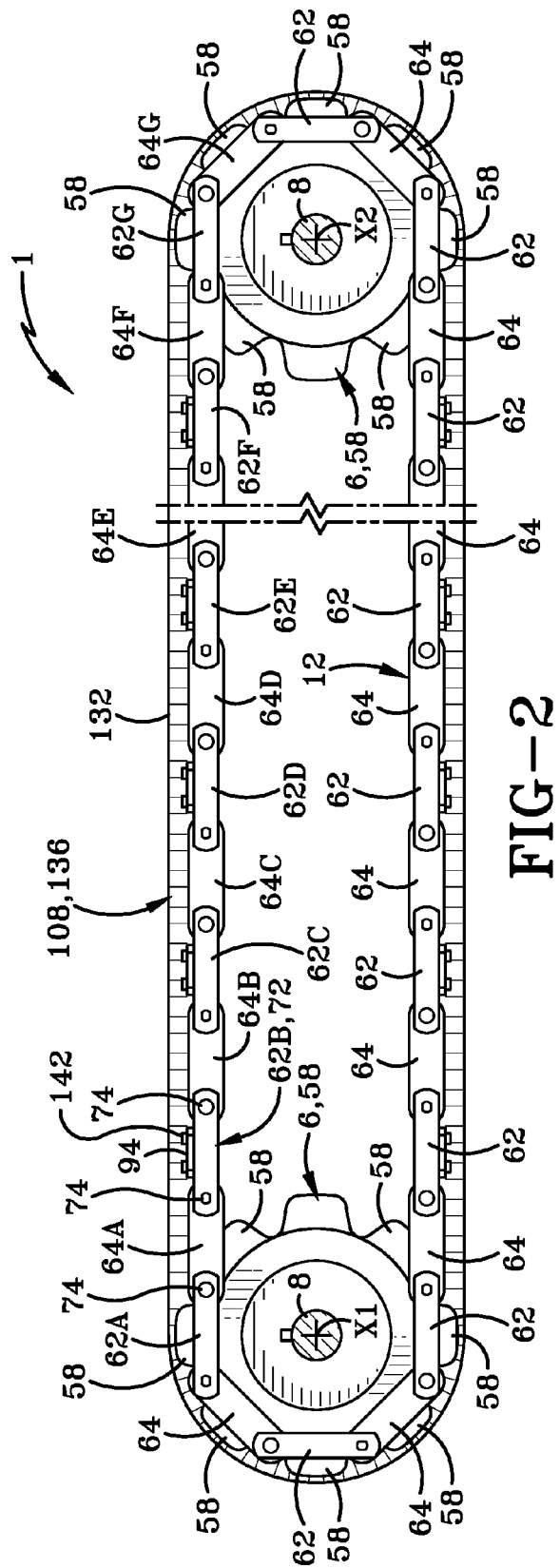
FIG. 2 (FIG. 2) is a sectional view taken on line 2-2 of FIG. 1.
Figure 3:
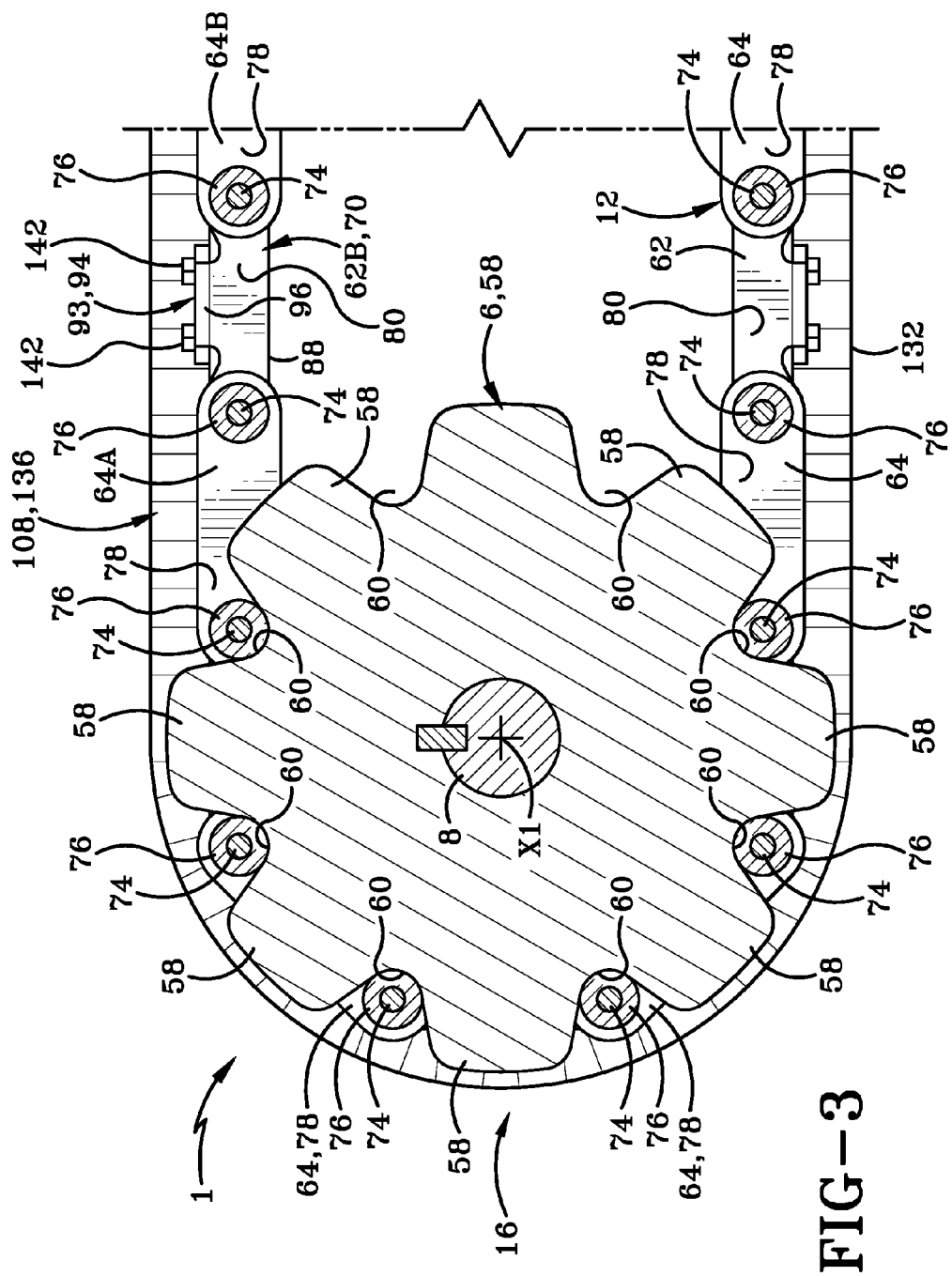
FIG. 3 (FIG. 3) is a sectional view taken on line 3-3 of FIG. 1.

The operation of assembly 1 is now described with primary reference to FIG. 1 and FIG. 1A. Motor 11 may be turned from an off position or state to an on position or state to cause rotation of its rotational output, which causes rotation of the upstream shaft 8, roller 4 and sprockets 6 (Arrow C at left of FIG. 1A). The rotational movement of sprockets 6 cause the revolution of chains 12 around their respective upstream and downstream sprockets 6 with teeth 58 received respectively in teeth-receiving spaces 78 and 80 and with pins 74 and rollers 76 received within respective spaces 60 of sprockets 6. As is understood in the art, teeth 58 of upstream sprockets 6 engage rollers 76 of the various chain links of the respective chains 12 and push them to force the revolving movement of chains 12. The revolving movement of each chain 12 causes the rotational movement of the downstream sprockets 6 via a similar engagement between the chain rollers and the teeth of the downstream sprockets. The revolving movement of chains 12 also causes the rotational movement of the downstream roller 4 and shaft 8 since the downstream shaft, roller and sprockets all rotate together (Arrow C at right of FIG. 1A). The rotational movement of the upstream sprockets also drives the revolving movement of bridges 14 and conveyor belt 2 via the connection between the chains 12 and bridges 14 and between the bridges 14 and conveyor belt 2. During the revolving movement of the chains 12, bridges 14, 14A and conveyor belt 2 and the rotational movement of the sprockets 6, shafts 8 and rollers 4, inner surface 30 of belt 2 engages outer surface 56 of each roller 4 with a rolling engagement therebetween. This revolving movement of the chains 12, bridges 14, 14A and conveyor belt 2 includes downstream movement of the upper segments of chains 12, bridges 14, 14A and conveyor belt 2 and upstream movement of the lower segments of chains 12, bridges 14, 14A and conveyor belt 2. Also during this revolving movement and rotation, the chains and bridge 14 or bridge segments 162 of bridge 14A may pivot about the various axes X4 relative to conveyor belt 2, whereby there may be a sliding engagement between the outer surface 28 of belt 2 and the inner surfaces 116 or 116A of bridge 14 or bridge segments 162. As with a standard conveyor belt, various loads may be placed atop the outer surface 30 of belt 2 along the upper segment 32 in order to transport or convey these materials in the downstream direction indicated by Arrow A in FIG. 1 and FIG. 1A. The cleats 44 may facilitate the movement of such materials with the downstream edges of the cleats 44 engaging such materials. During the revolving movement and rotational movement noted above, bridge 14 or segments 162 of bridge 14A may also flex upwardly and downwardly due to the elastomeric material of which the bridge is primarily formed.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. An apparatus comprising:
   a conveyor belt comprising an elastomeric layer and having first and second side edges;
   a chain adjacent the first side edge;
   a flexible bridge forming a closed loop and further comprising an elastomeric layer which forms an elastomeric layer closed loop, the flexible bridge extending between and connected to the chain and the conveyor belt along the first side edge; and
   wherein the flexible bridge further comprises a serpentine seal.

2. The apparatus of claim 1 wherein the flexible bridge comprises an elastomer.

3. The apparatus of claim 2 wherein the flexible bridge overlaps the conveyor belt along the first side edge.

4. The apparatus of claim 1 wherein the chain comprises a first chain link having an inner link plate adjacent the first side edge and a tongue which extends from the inner link plate toward the flexible bridge and which is connected to the flexible bridge.

5. The apparatus of claim 4 further comprising a first fastener which extends from the tongue to the flexible bridge.

6. The apparatus of claim 4 wherein the first chain link has an outer link plate spaced from the inner link plate, and first and second pins which are spaced from one another and extend from the inner link plate to the outer link plate.

7. The apparatus of claim 4 wherein the inner link plate and tongue are formed of a piece of metal which has a bend at which the tongue is secured to the inner link plate.

8. The apparatus of claim 1 further comprising a first fastener which extends from the flexible bridge to the conveyor belt.

9. The apparatus of claim 8 wherein the first fastener serves as a pivot about which the flexible bridge is pivotable relative to the conveyor belt.

10. The apparatus of claim 8 wherein the first fastener comprises a threaded portion.

11. The apparatus of claim 10 wherein the threaded portion threadedly engages one of the conveyor belt and a nut.

12. The apparatus of claim 8 further comprising a second fastener which extends from the flexible bridge to the chain.

13. The apparatus of claim 1 wherein the flexible bridge comprises a plurality of flexible bridge segments which are spaced from one another.

14. The apparatus of claim 13 wherein each of the flexible bridge segments comprises an elastomer.

15. The apparatus of claim 14 further comprising a first fastener which extends from a first one of the flexible bridge segments to the conveyor belt; and a second fastener which extends from the first one of the flexible bridge segments to the chain.

16. An apparatus comprising:
   a conveyor belt comprising an elastomeric layer and having first and second side edges;
   a chain adjacent the first side edge;
   a flexible bridge forming a closed loop and further comprising an elastomeric layer which forms an elastomeric layer closed loop, the flexible bridge extending between and connected to the chain and the conveyor belt along the first side edge; and
   wherein the flexible bridge further comprises an essentially flat wall which forms a closed loop and an upstanding wall which extends outwardly from the essentially flat wall.

17. An apparatus comprising:
a conveyor belt comprising an elastomeric layer and having first and second side edges;
a chain adjacent the first side edge; and
a flexible bridge extending between and connected to the chain and the conveyor belt along the first side edge;
wherein the first side edge defines a first side edge closed loop and the flexible bridge forms a closed loop which extends along the entirety of the first side edge closed loop.

18. The apparatus of claim 17 wherein the flexible bridge further comprises an essentially flat wall which forms the closed loop and an upstanding wall which extends outwardly from the essentially flat wall.

\* \* \* \* \*